United States Patent [19]

Maurer

[11] 3,833,179
[45] Sept. 3, 1974

[54] MANDREL

[76] Inventor: Ruprecht Maurer, Schaberweg 32-34, 6380 Bad Homburg, Germany

[22] Filed: Nov. 28, 1972

[21] Appl. No.: 309,979

[52] U.S. Cl. .............................................. 242/46.4
[51] Int. Cl. ............................................ B65h 54/54
[58] Field of Search ....... 242/46.4, 46.2, 46.3, 46.5, 242/72, 72.1, 68.1, 68.2, 68.3, 18 R

[56] References Cited
UNITED STATES PATENTS

| | | | |
|---|---|---|---|
| 3,462,092 | 8/1969 | Mullins | 242/46.4 |
| 3,526,369 | 9/1970 | Beckwith, Jr. | 242/46.4 |
| 3,722,808 | 3/1973 | Brown | 242/46.4 |

FOREIGN PATENTS OR APPLICATIONS

| | | | |
|---|---|---|---|
| 1,100,867 | 3/1961 | Germany | 242/18 R |
| 1,262,718 | 3/1968 | Germany | 242/18 R |

*Primary Examiner*—Stanley N. Gilreath
*Attorney, Agent, or Firm*—Webb, Burden, Robinson & Webb

[57] ABSTRACT

In spool mandrels having clutch discs which transmit torque between spool shafts and spools when axial clutching pressure is applied to the discs, a biasing arrangement in which the clutching pressure is transmitted to the disc and radially movable contact elements positioned in the spool shaft press against a cam surface of a bushing, such that at high speeds the centrifugal force on the contact members increases the clutching pressure.

5 Claims, 3 Drawing Figures

MANDREL

SPECIFICATION

The invention relates to a clutch device for coupling and uncoupling driving spool shafts and spools intended for yarn, man-made fibers and glass fibers or the like. Spools and spool shafts commonly having annular clutch discs which are in the shape of a flat cone and are provided with radial slots alternately on their inner and outer edges. The annular clutch discs rest with their inner edge indirectly or directly on a rotatable shaft of an axially expanding mandrel and with their outer edge against the inner surface of a spool which is in the form of a hollow cylinder. The clutch discs increase their outside diameter and engage the spool as the result of axial pressure generated by built-in spring members.

Such spool expanding mandrels have, for example, been described in German Auslegeschrift 1,047,985. They have stood up very well by comparison with other known clutch devices due to their great accuracy of rotation and their good torque transmission. However, since in the manufacture of synthetic and glass fibers, for example, rotational speeds of the spool are demanded which are much higher than usual, for example, speeds of about 10,000 revolutions per minute. At these speeds the above-mentioned spool expanding mandrels run the risk that as the result of the great centrifugal forces the movable annular clutch discs will lift off from their seat, will be subjected to uncontrollable displacement and will be destroyed.

As can be readily demonstrated, at high rotational speeds the centrifugal force acting on the annular clutch discs creates an axial force which acts upon the adjacent parts and opposes the axial force created by the built-in spring elements. When this axial force component which is created by the centrifugal force overcomes the axial force produced by the spring elements, then the annular discs will lift off from their seat on the shaft and the centering of the spool is no longer assured. This results in uneven running of the tensioning device as well as of the spool, and also in breaking of the fiber and similar difficulties.

The axial pressure which is created at very high speeds exceeds the strength of the built-in springs intended to counteract the centrifugal forces. Any increase in the axial pressure produced by these springs is limited by the fact that these springs must be sufficiently supple so that the tensioning device can be released by hand without too much exertion. Therefore, the said spring elements which produce the axial pressure cannot be strengthened for the purpose of standing up under maximum rotational speeds and under the resulting centrifugal forces arising in the flat-coned annular discs.

Briefly, according to this invention, in a spool mandrel having clutch discs which transmit torque between a spool shaft and the spool, the clutch spring pressure is transmitted to the clutch discs through independent coaxial elements. One or more elements referred to herein as bushings are positioned slidably over and radially outward of the spool shaft. The bushings have an internal conical cam surface inclined toward the axis of rotation. At the end the bushing contacts the clutch discs. The other element referrred to herein as the spring shaft is slidably positioned radially inward of the spool shaft and is arranged to cooperate with a spring. The spring shaft has an external conical cam face inclined toward the axis of rotation. Contact members disposed in radial holes in the spool about the two cam faces completing the mechanical force conducting path between the spring and the clutch discs. As the spring shaft is moved in its bias direction by the spring, its cam surface forces the connecting elements radially outward which in turn forces the bushings against the clutch discs. During high speed rotation, centrifugal force drives the connecting elements outward against the cam surface on the bushings putting additional force or pressure against the clutch discs independent of the clutch spring. It is well understood that this mechanical force conducting path can also be achieved without these contact members but using any other suitable means.

Preferably, for practical purposes, the contact members are shaped as balls or rollers and are made of a synthetic or plastic material. According to a preferred embodiment, the contact members which can move solely in a radial direction, are disposed between the cam faces of an axially movable spring shaft and the adjacent cam faces of two axially movable bushings whose opposite faces abut against annular clutch discs. The cam faces on both bushings are inclined toward the axis of the shaft. It is also possible to arrange contact members with their associated bushings and annular discs repeatedly two or more times on one expanding mandrel shaft.

For practical purposes, the surface finish, the material used, and the angle of inclination of the cam face on the spring shaft are selected such that static friction will exist between the cam face and the contact member.

Advantageously, the axially movable bushing which abuts with its front face against the annular discs is provided with a shoulder against which the inner edge of the annular discs is braced.

It is an object of this invention to provide a clutching device which even at high rotational speeds centers the spool and will assure reliable transmission of the torque and yet can be easily disengaged by hand.

Other objects and advantages of this invention will become clear from a study of the following detailed description.

Two embodiments of the invention are fully explained and described with the aid of the drawings in which.

Figure 1:
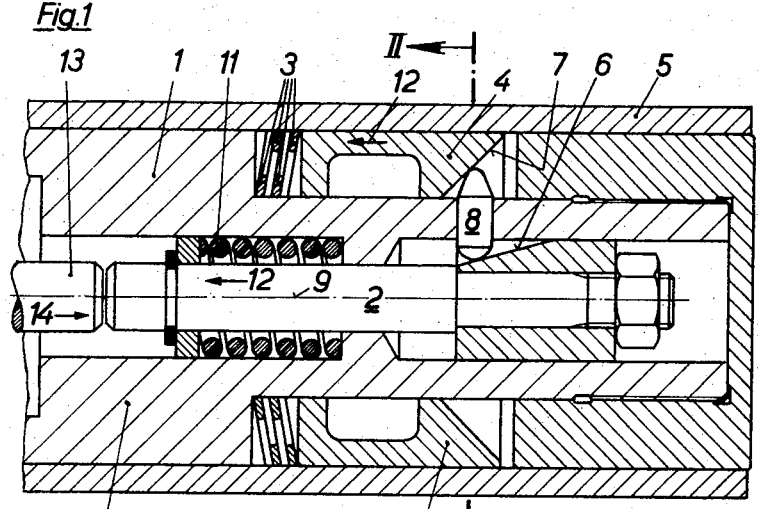
FIG. 1 is a longitudinal section of a first embodiment.
Figure 2:
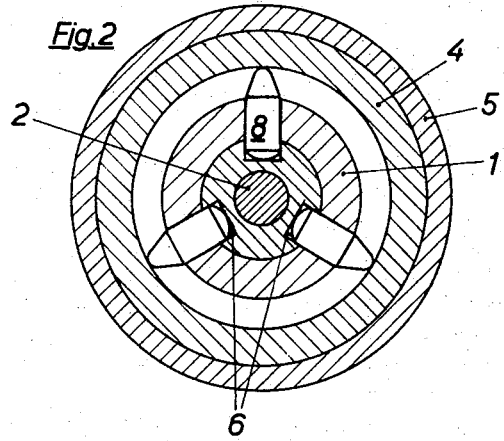
FIG. 2 is a cross-section taken along line II-II of FIG. 1.

The embodiment of the clutching device described in FIGS. 1 and 2 comprises a rotatable shaft 1 of an expanding mandrel and an axially movable spring shaft 2 which is urged in the direction of arrow 12 by means of coil spring 11. This axially movable spring shaft 2 of the expanding mandrel shaft 1 is provided with external conical cam faces 6 which slope toward shaft axis 9. Contact members 8 which are displaceable only in a radial direction rest on cam faces 6 with their radially inwardly directed end. Due to suitably designed guideways provided in shaft 1 of the expanding mandrel, contact members 8 cannot move in an axial direction.

The radially outwardly directed end of contact members 8, on the other hand, rests on internal conical cam faces 7 which likewise slope toward shaft axis 9 and form a part of an axially movable bushing 4 which abuts against annular discs 3 with its opposite face. This transmits to the annular discs the axial pressure which is generated by coil spring 11 and which is necessary to render annular discs 3 operative. Thus, the outer edge of discs 3 is pressed under tension in the desired manner against the inner surface of spool 5 which is in the shape of a hollow cylinder.

This positive connection between spool 5 and annular discs 3 may be released by pressing ram 13 inwardly to move in a direction of arrow 14 while simultaneously compressing coil spring 11. When coil spring 11 is compressed, spool 5 may be pulled off the shaft of the expanding mandrel.

When very high speeds of rotation are used, the centrifugal force of axially movable contact members 8 generates an additional force component which acts axially and as a function of the speed of rotation increases the axial pressure in bushing 4 that is exerted by coil spring 11 in the direction of arrow 12. This compensates for and neutralizes the centrifugal force-axial component which acts in the reverse direction on the contact points between annular discs 3 and bushing 4.

Figure 3:
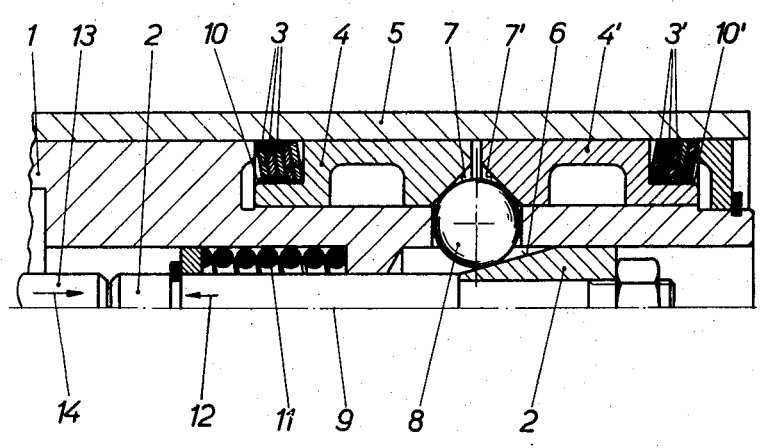
FIG. 3 is a partial longitudinal section through a second embodiment.

The embodiment shown in FIG. 3 uses spherical contact members 8 which, moreover, exert pressure in the desired described manner on two associated bushings 4 and 4' simultaneously. Furthermore, the bushings 4 and 4' of this embodiment are provided with shoulders 10 and 10' against which the inside edges of annular discs 3 and 3' abut. The other members bearing the same reference numerals have the same function as similar members in FIGS. 1 and 2.

It is also possible to make other embodiments which are not illustrated in the drawings and in which the arrangement of contact members with their associated bushings and annular discs can be repeated two or more times on one expanding mandrel shaft.

The described invention has the advantage of avoiding the lifting off of the annular clutch discs from their seat because during rotation the contact members are pressed by centrifugal force against the surfaces that are inclined toward the axis of the shaft and thereby counteract the axial component of the centrifugal force of the annular discs. With the proper construction, this force can be equalized directly or the centrifugal force of the contact members can generate support of the tension by means of the spring. The invention also makes it possible to arrange several sets of annular discs consecutively on one shaft, particularly when long spools are being used.

Having thus described the invention with the detail and particularity as required by the Patent Laws, what is desired to be protected by letters Patent is set forth in the following claims.

I claim:

1. In a releasable spool mandrel device comprising a plurality of annular clutch discs arranged to transfer torque through their outer edges to the interior cylindrical surface of a spool when axial force is applied to said discs, the improvement comprising said mandrel device comprising a spool shaft (1), bias transfer means (2), and at least one bushing (4), said spool shaft, bias transfer means and at least one bushing being coaxial and slidable relative to each other, said bushing being radially outward of at least a portion of said spool shaft, said at least one bushing (4) having an internal conical cam surface (7) inclined toward the axis and at one end means for contacting the clutch discs (3), a plurality of contact members (8) slidably disposed in said spool shaft (1) for radial movement, said contact members (8) contacting the cam surface (7) on at least one bushing (4), and means for biasing (11) said bushing against said discs through said bias transfer means and contact members such that axial movement of the bias transfer means relative to said spool shaft forces the contact members outward thus applying pressure through the at least one bushing to the clutch discs and centrifugal force moves the contact member radially outward applying further pressure to the clutch discs at high rotational speeds.

2. A spool mandrel according to claim 1 characterized by the fact that the contact members (8) are spherical or roller-shaped.

3. A spool mandrel according to claim 1 characterized by the fact that the contact members are made of a synthetic material.

4. A spool mandrel according to claim 1 characterized by the axially movable bushing (4) which abuts the annular discs being provided with a shoulder against which the annular discs (3) are braced with their inner edge.

5. In a releasable spool mandrel device comprising a plurality of annular clutch discs arranged in two separate sets (3, 3') to transfer torque through their outer edges to the interior cylindrical surface of a spool when axial force is applied to said discs, said mandrel device comprising a spool shaft (1), bias transfer means (2), and two bushings (4, 4'), said spool shaft, bias transfer means and bushings being coaxial and slidable relative to each other, said bushings being radially outward of at least a portion of said spool shaft, each bushing (4, 4'), having an internal conical cam surface (7, 7') inclined toward the axis and at one end means for contacting one set of clutch discs, a plurality of contact members (8) slidably disposed in said spool shaft (1) for radial movement, said contact members (8) contacting the cam surfaces (7, 7') on the bushings (4, '), and means for biasing (11) said bushings against said discs through said bias transfer means and contact members such that axial movement of the bias transfer means relative to said spool shaft forces the contact members outward thus applying pressure through the bushings to the two separate sets of clutch discs and centrifugal force moves the contact members radially outward applying further pressure to the clutch discs at high rotational speeds.

* * * * *